Nov. 20, 1923

R. ZREBIEC

FLOWER DISPLAY HOLDER

Filed Aug. 31, 1922

1,474,753

WITNESS

INVENTOR
Rose Zrebiec
By Jack R. Snyder
Attorney

Patented Nov. 20, 1923.

1,474,753

UNITED STATES PATENT OFFICE.

ROSE ZREBIEC, OF BEAVER FALLS, PENNSYLVANIA.

FLOWER-DISPLAY HOLDER.

Application filed August 31, 1922. Serial No. 585,554.

*To all whom it may concern:*

Be it known that I, ROSE ZREBIEC, a citizen of the United States, residing at Beaver Falls, in the county of Beaver and State of Pennsylvania, have invented certain new and useful Improvements in Flower-Display Holders, of which the following is a specification.

This invention relates to a flower display holder, and while primarily designed for displaying growing flowers and plants, it is obvious that the device may be employed for exhibiting any desired objects.

Important objects of the invention are to provide a flower display holder of the type described, in a manner as hereinafter set forth, which affords novel supporting means for collectively mounting individual units of growing plants and flowers in an attractive manner and permitting of the removal and replacement of the separate units, and which embodies a receptacle common to all the individual units and adapted for the reception of the drippings therefrom due to excessive moisture.

These and such other objects as may hereinafter appear are attained by a flower display holder of a novel construction that will be presently described in detail, and pointed out in the appended claims and reference will then be had to the drawing forming a portion of this specification wherein there is illustrated a preferred embodiment of my invention, but it is to be understood that variations in the construction of the stand can be resorted to without departing from the principle or sacrificing any of the advantages of the invention, which come within the scope of the appended claims.

In the drawing forming a part of this specification and wherein like numerals of reference designate corresponding parts throughout the several views:—

Figure 1:
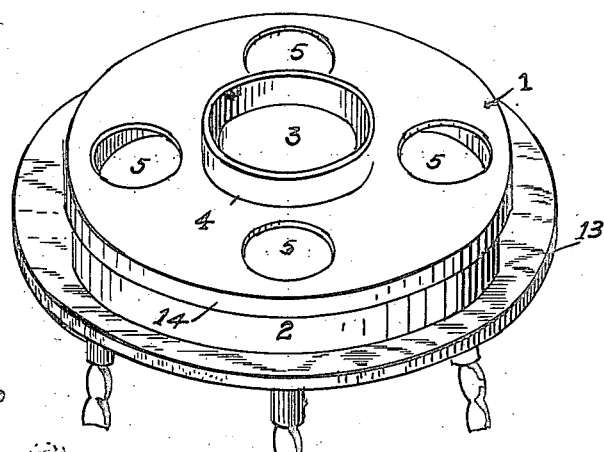
Figure 1 is a perspective view of a flower display holder in accordance with this invention.
Figure 2:
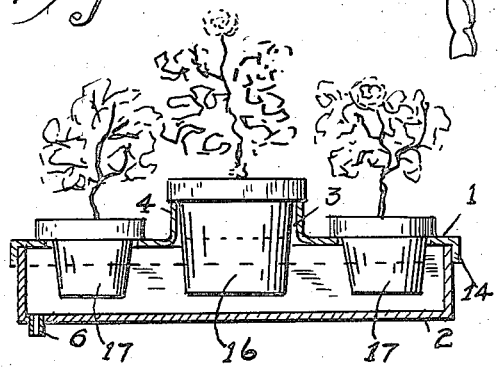
Figure 2 is a vertical sectional view thereof illustrating containers with flowers mounted in the holder.
Figure 3:
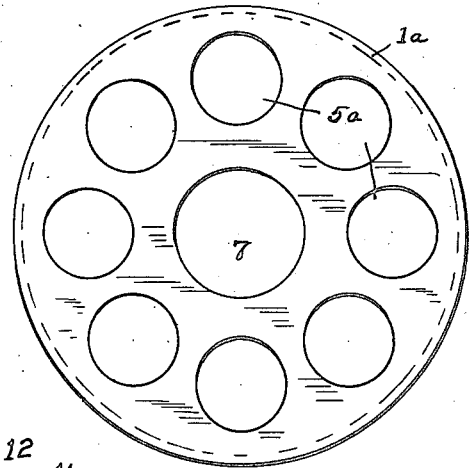
Figure 3 is a top plan view of a modified form of flower display holder.

Referring in detail to the drawing 1 denotes a circular holder formed with a peripheral depending flange 14. The holder virtually constitutes a cover for the circular receptacle 2 which latter is overlapped by the depending flange 14 of the holder 1.

The holder 1 is constructed with a vertically extending sleeve 4 formed centrally of the holder 1, and providing an enlarged opening 3 adapted for the reception of a flower pot or container 16. The holder 1 is further constructed with a series of regularly spaced smaller openings 5, all of which are spaced an equal distance from each other and from the sleeve 4. Each opening 5 is adapted for the reception of a flower pot 17, preferably of smaller size than the centrally disposed pot 16.

The pots 17 being smaller and positioned on a lower plane on the holder than the pot 16 an attractive grouped floral display may be arranged on the holder.

As the holder 1 is primarily intended for growing plants and flowers, the latter will require constant moisture which if excessive will accumulate in the receptacle 2 positioned directly beneath the holder 1, and may be discharged through the drain 6.

The whole device is preferably constructed from sheet metal and may be mounted at any suitable height from the floor by means of a stand 13, as shown, or upon any desired support.

The modified form of the holder 1ª shown in Figure 5, is identical in construction as that referred to above relative to the preferred form with the exception that no central sleeve is provided, but has a flat top provided with a large central opening 7 surrounded by a plurality of equally spaced smaller apertures 5ª.

Figure 4:
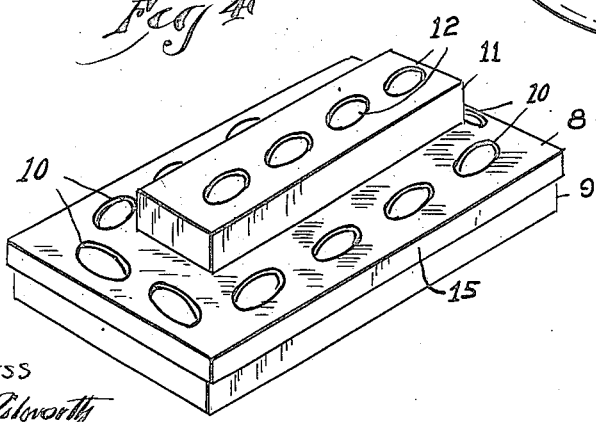
Figure 4 is perspective view of still another modified form of holder.

The modification shown in Figure 4 comprises a holder 8 rectangular in contour and provided with a rectangular receptacle 9 which is overlapped by the depending flange 15 carried by the holder 8. The holder 8 is formed with a centrally disposed rectangular elevated portion 11 formed with a plurality of openings 12, and a plurality of equally spaced openings 10 are formed in the holder 8 and entirely surround the elevated portion 11 thereof.

What I claim is:—

1. A display device comprising an open top receptacle provided with a drain, a detachable flat holder member seated on said receptacle and formed with a depending flange positioned against the outer periphery of the receptacle, said member formed with a centrally arranged opening surrounded by a circular row of openings, and a sleeve extending upwardly from said member and registering with said central opening.

2. A display device comprising an open top receptacle provided with a drain, a detachable flat holder member seated on said receptacle and formed with a depending flange positioned against the outer periphery of the receptacle, said member formed with a centrally arranged opening surrounded by a circular row of openings, and a sleeve extending upwardly from said member and registering with said central opening, said sleeve of greater diameter than the diameter of any one of the openings of said row.

3. A display device comprising an open top circular receptacle provided with a drain, a detachable flat circular holder member seated on said receptacle and formed with a depending flange positioned against the outer periphery of the receptacle, said member formed with a centrally arranged opening surrounded by a circular row of openings, and a sleeve extending upwardly from said member and registering with said central opening.

4. A display device comprising an open top receptacle provided with a drain, and a detachable flat holder member seated on said receptacle and formed with a depending flange positioned against the outer periphery of the receptacle, said member formed with a centrally arranged opening surrounded by a circular row of openings, said central opening of greater diameter than the diameter of any of the openings of said row.

5. A display device comprising an open top receptacle provided with a drain, and a detachable flat holder member seated on said receptacle and formed with a depending flange positioned against the outer periphery of the receptacle, said member provided with an upwardly extended support and a row of openings surrounding the base of the support.

In testimony whereof I affix my signature.

ROSE ZREBIEC.